July 9, 1940. L. F. ATHY ET AL 2,207,281
SEISMIC METHOD OF LOGGING BOREHOLES
Filed April 16, 1938 9 Sheets-Sheet 5

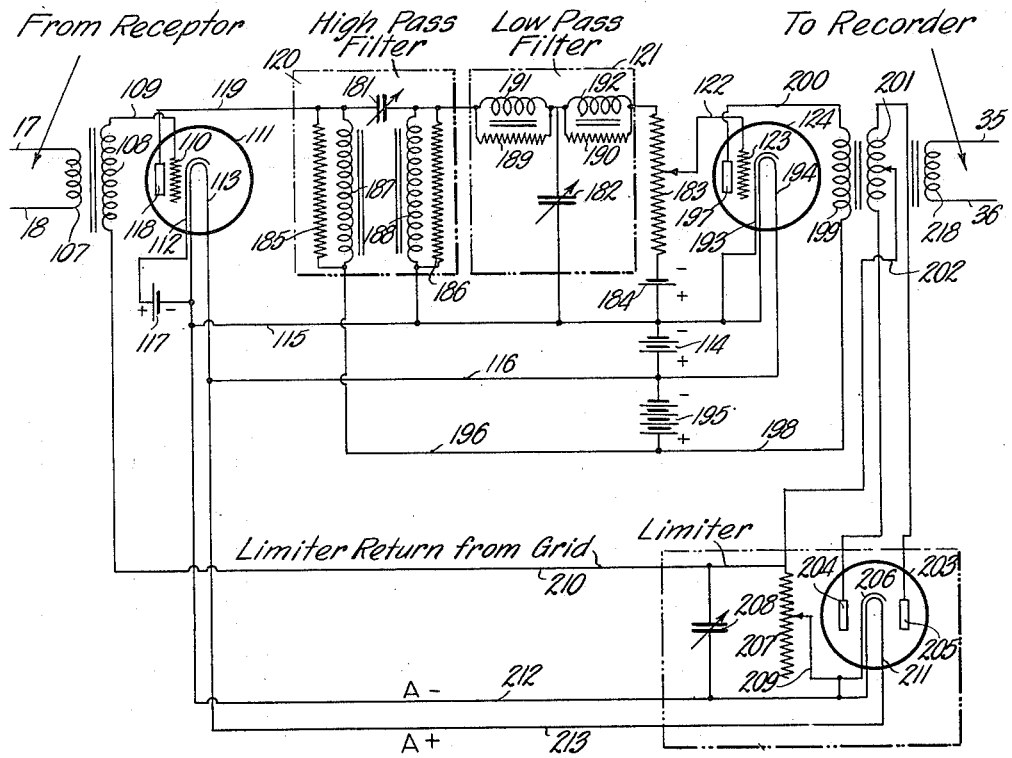
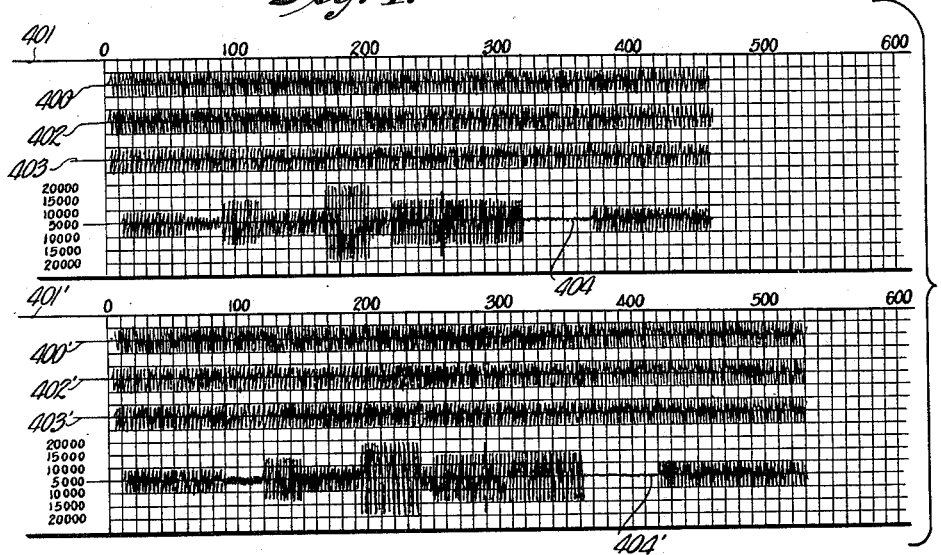

INVENTORS
Lawrence F. Athy
Harold R. Prescott
BY
ATTORNEY

July 9, 1940.　　　L. F. ATHY ET AL　　　2,207,281
SEISMIC METHOD OF LOGGING BOREHOLES
Filed April 16, 1938　　　9 Sheets-Sheet 9

INVENTORS
Lawrence F. Athy
Harold R. Prescott
BY
ATTORNEY

Patented July 9, 1940

2,207,281

UNITED STATES PATENT OFFICE 2,207,281

SEISMIC METHOD OF LOGGING BOREHOLES

Lawrence F. Athy and Harold R. Prescott, Ponca City, Okla., assignors to Continental Oil Company, Ponca City, Okla., a corporation of Delaware Application April 16, 1938, Serial No. 202,483

20 Claims. (Cl. 181—0.5)

Our invention relates to a seismic method of logging boreholes.

More or less parallel beds of rock materials are pierced by boreholes drilled for exploratory purposes in seeking oil or gas. It is essential to prospectors to be able to recognize certain identifying characteristics of the beds penetrated in order that the geological structure of the buried formations may be accurately determined. This geological structure is a guide in seeking accumulations of oil, gas, or other valuable deposits. By recognizing and logging a sequence of identifying characteristics with respect to depth or sea level elevation in individual boreholes, it is possible to determine the relative structural attitude and position of the various rock formations contributing to these recognizable characteristics.

In geological explorations, core drilling has been resorted to in order to determine the characteristics of the beds penetrated. A record or log is kept showing the different formations traversed. This log is obtained by sampling the drill cuttings to determine their variation in mineral content or rock type. It is a common practice to sample the drill cuttings taken from boreholes and from a careful study of these cuttings to determine their variation of mineral content or rock type with depth or elevation and thereby provide a subsurface map of the structure of said buried formations. Commonly, holes are drilled to relatively shallow depths solely for purposes of determining the structure of the subsurface. In many areas it is impossible or difficult to correlate cuttings from one well with those of another, thereby rendering structural determination by this method ineffective. Sometimes actual cores or chunk samples of the various formations penetrated by the drill are taken in order that the beds may be recognized and correlated. This procedure is slow and expensive, and frequently necessitates deep drilling in order to penetrate recognizable marker beds which may be correlated from hole to hole.

It is a well known fact that the rate of transmission of seismic waves by different types of buried rock materials varies widely. This rate is a function of elasticity, density, depth of burial, pressure, and the intrinsic physical character of the transmitting material. For example, a limestone formation being highly elastic may have a relatively high transmitting rate of seismic energy in the order of from 15,000 to 20,000 feet per second. Shales are normally much less elastic and will transmit elastic waves at rates between 5,000 to 10,000 feet per second at relatively shallow depths of burial. Hard sandstone will transmit seismic waves at a rate between 12,000 to 15,000 feet per second, while soft porous sandstone will transmit elastic waves at a velocity of between 6,000 and 10,000 feet per second.

One object of our invention is to provide a novel method of logging boreholes.

Another object of our invention is to provide a novel method of logging boreholes by means of velocity transmission characteristics of seismic energy through geological strata surrounding the borehole.

Other and further objects of our invention will appear from the following description.

In the accompanying drawings which form part of the instant specification and are to be read in conjunction therewith and in which like reference numerals are used to indicate like parts in the various views;

Figure 4 is a schematic view of an amplifying system capable of use in carrying out our invention.

Figure 9 is a view of record strips obtained by means of our invention from the boreholes shown in Figure 1.

Figure 1:
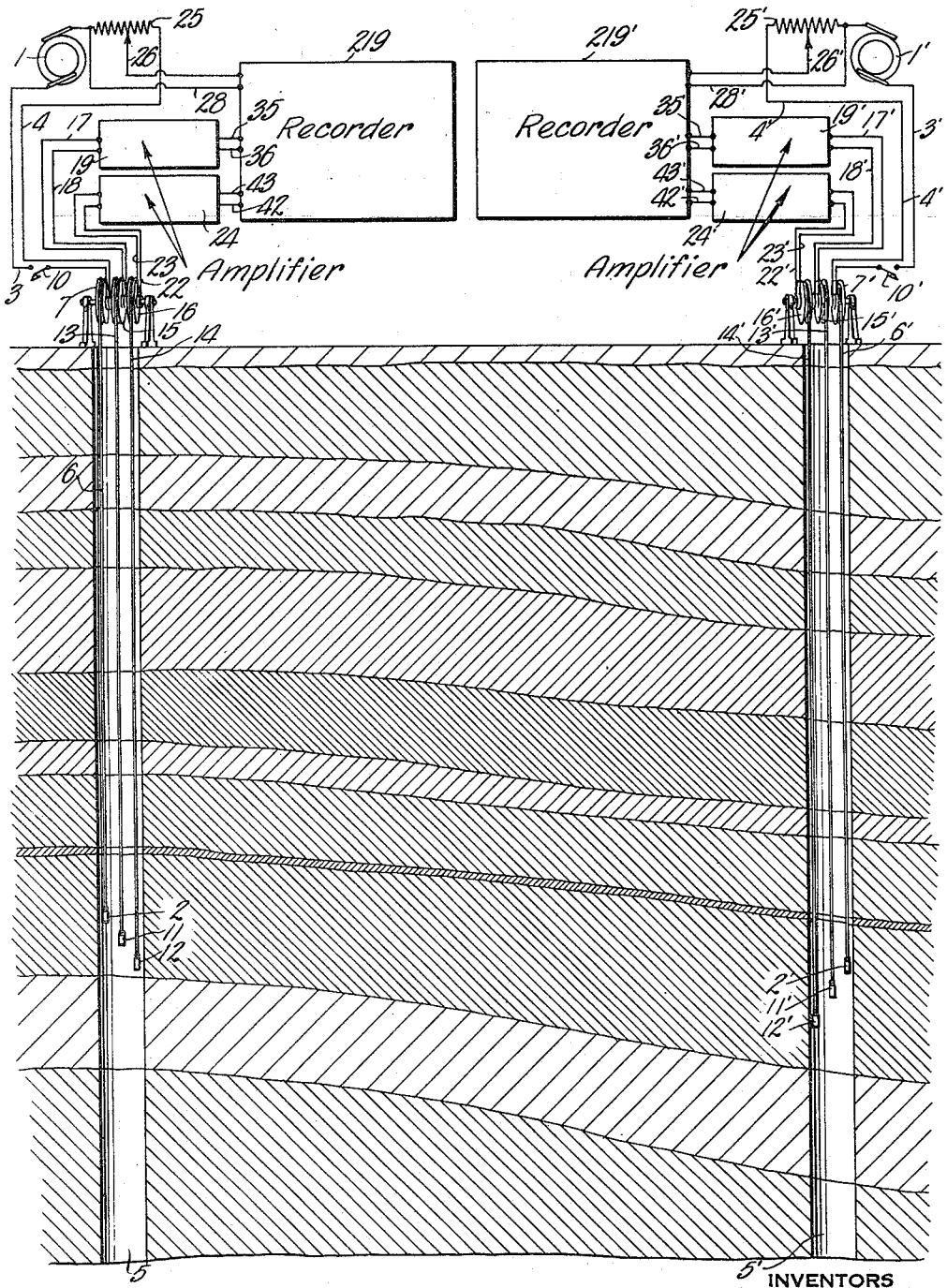
Figure 1 is a diagrammatic view of a geological section showing boreholes provided with apparatus capable of carrying out our invention.

In the drawings, layers closely hatched indicate high velocity layers, while widely hatched layers indicate slow velocity beds.

Figure 2:
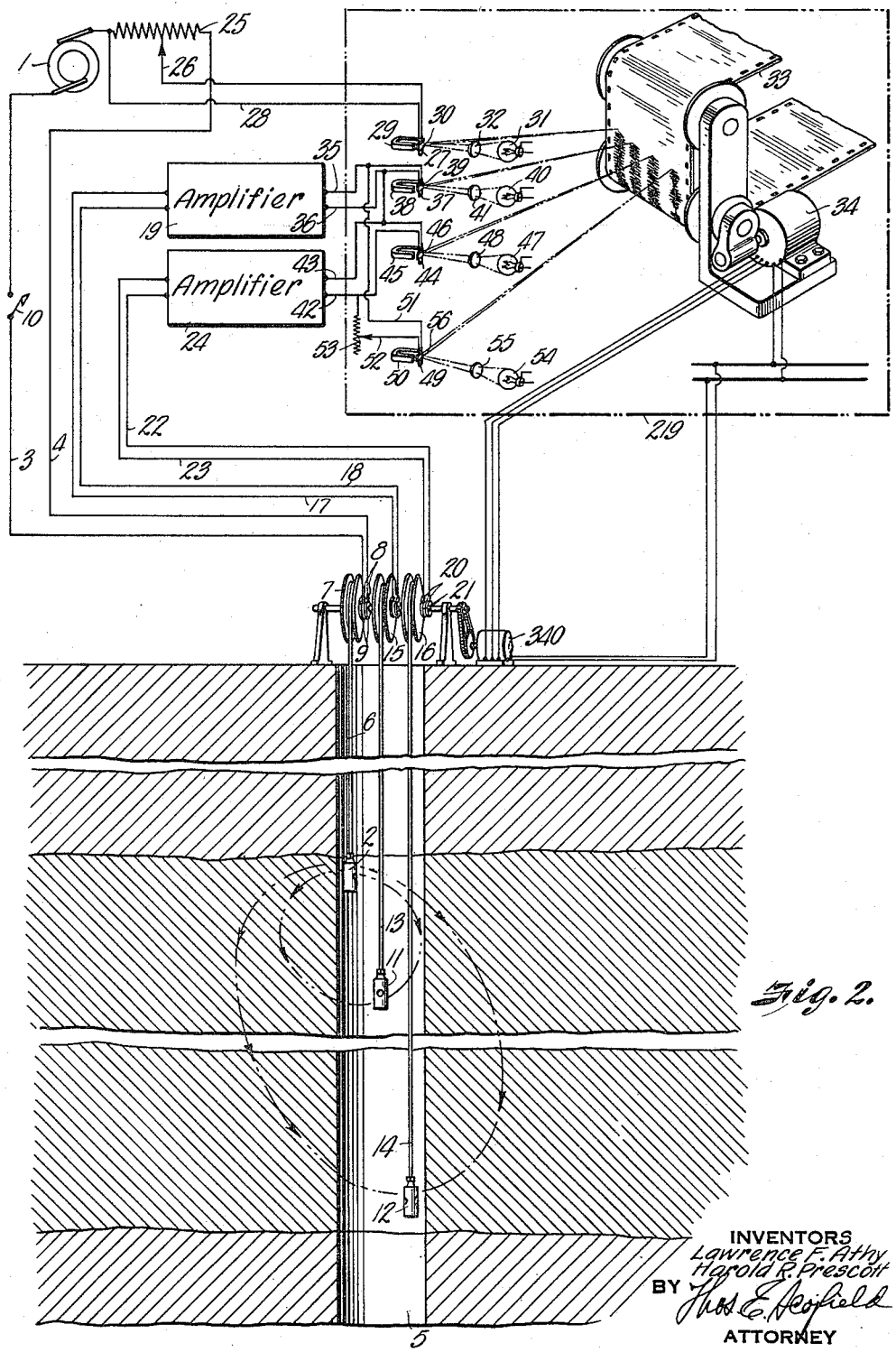
Figure 2 is a diagrammatic view on an enlarged scale of a borehole fitted with apparatus capable of carrying out our invention.

Referring now to Figure 2, an alternator 1 delivers alternating potential to the transmitter 2 through conductors 3 and 4. The transmitter is a source of seismic waves and is lowered into the drill hole 5 by means of an electric cable 6 which is normally housed upon a reel 7, energy being transmitted through brushes 8 and slip rings 9. The circuit is adapted to be closed by a key 10 if transient effects are desired, as will be more fully pointed out hereinafter. Receptors 11 and 12 are of any suitable construction and are adapted to receive seismic waves and convert them into voltages in sympathy with the seismic waves. Receptors 11 and 12 are suspended into the drill hole by means of electric cables 13 and 14 which are housed upon reels 15 and 16. The ends of the cable 13 are electrically connected by brushes and slip rings to conductors 17 and 18 which are adapted to impress the voltages received by receptor 11 upon an amplification system shown diagrammatically in Figure 2 by the reference numeral 19. The ends of cable 14 are electrically connected by brushes 20 and slip rings 21 to conductors 22 and 23 which are adapted to impress the voltages generated by receptor 12 upon an amplification system shown diagrammatically by the reference numeral 24. A resistance 25 is placed in one of the output leads 4, leading to the transmitter 2. The resistance is tapped by a variable arm 26 leading to one side of the oscillograph element 27. The other side of oscillograph element 27 is connected across the resistance by conductor 28. It will be readily apparent that the leads 26 and 28 placing the oscillograph element 27 across the resistance 25 will furnish an index of the current flowing from the current source 1. The oscillograph element 27 will measure the voltage across the resistance. Since the resistance is fixed, the voltage across the resistance will vary as a function of the current. The oscillograph element 27 is supported within the field of magnet 29 and carries a mirror 30 upon which light from an incandescent lamp 31 is projected by a lens 32 for reflection upon a sensitized strip 33 adapted to be moved past the light spot by any suitable means such as electric motor 34. The output of amplification system 19 is conducted by leads 35 and 36 to the oscillograph element 37, supported within the field of a magnet 38. The oscillograph element 37 carries a mirror 39 upon which light from an incandescent lamp 40 is adapted to be projected by lens 41 for reflection upon the sensitized strip 33. The output of amplification system 24 is adapted to be impressed by conductors 42 and 43 upon an oscillograph element 44 supported within the field of a magnet 45. The oscillograph element 44 carries a mirror 46 upon which light from an incandescent lamp 47 is adapted to be projected by lens 48 for reflection upon the sensitized strip 33. In order to provide means for indicating the relative phase changes of the alternating voltages generated by receptors 11 and 12, we provide a fourth oscillograph element 49 positioned within the field of a magnet 50. The oscillograph element 49 is connected across conductor 42 of amplification system 24 and conductor 35 of amplification system 19 by conductors 51 and 52. In order to govern the amplitude of the oscillograph trace, a variable resistance 53 is interposed in series with the oscillograph element 49.

The sensitivity of oscillograph element 49 is adjusted to be much greater than oscillograph element 44 or 37 and the current in oscillograph element 49 is minimized by arm 52 of resistance 53. By using high element sensitivity for oscillograph element 49 and high resistance as determined by arm 52 the current from oscillograph element 49 through return conductor 51 and through oscillograph elements 37 and 44 will have substantially no effect on the motion of oscillograph elements 37 and 44.

The arrangement is such that, when the trace of the oscillograph element 37 is in phase with oscillograph element 44, the oscillograph element 49 will indicate large amplitudes but when the traces of the oscillograph elements 37 and 44 are out of phase, the oscillograph element 49 will give small amplitudes. Light from an incandescent lamp 54 is adapted to be focused by lens 55 upon a mirror 56 carried by oscillograph element 49. The light is reflected upon the strip 33 in side by side relation with the light beams from mirrors 30, 39, and 46. The oscillograph elements 27, 37, 44, and 49 are quite high in natural frequency so that, for the frequencies recorded by them, they may be regarded as practically without inertia and capable of producing the wave forms received by them faithfully, in amplitude and frequency.

The reels may be driven by a motor 340 which is synchronized with record strip motor 34 so that movement of the transmitter 2 and receptors 11 and 12 within the borehole 5 will be a function of the movement of the record strip.

Referring now to Figure 1, there is shown a borehole 5 with associated apparatus, and a borehole 5' and associated apparatus. It is contemplated that, if desired, the transmitter energy may be increased so that seismic energy from the transmitter 2 will be received at receptors 11 and 12 and also at receptors 11' and 12'. Likewise, energy from transmitter 2' will be received not only at receptors 11' and 12' but also at receptors 11 and 12 so that boreholes 5 and 5' can be readily correlated from the record strips thus made.

Figure 3:
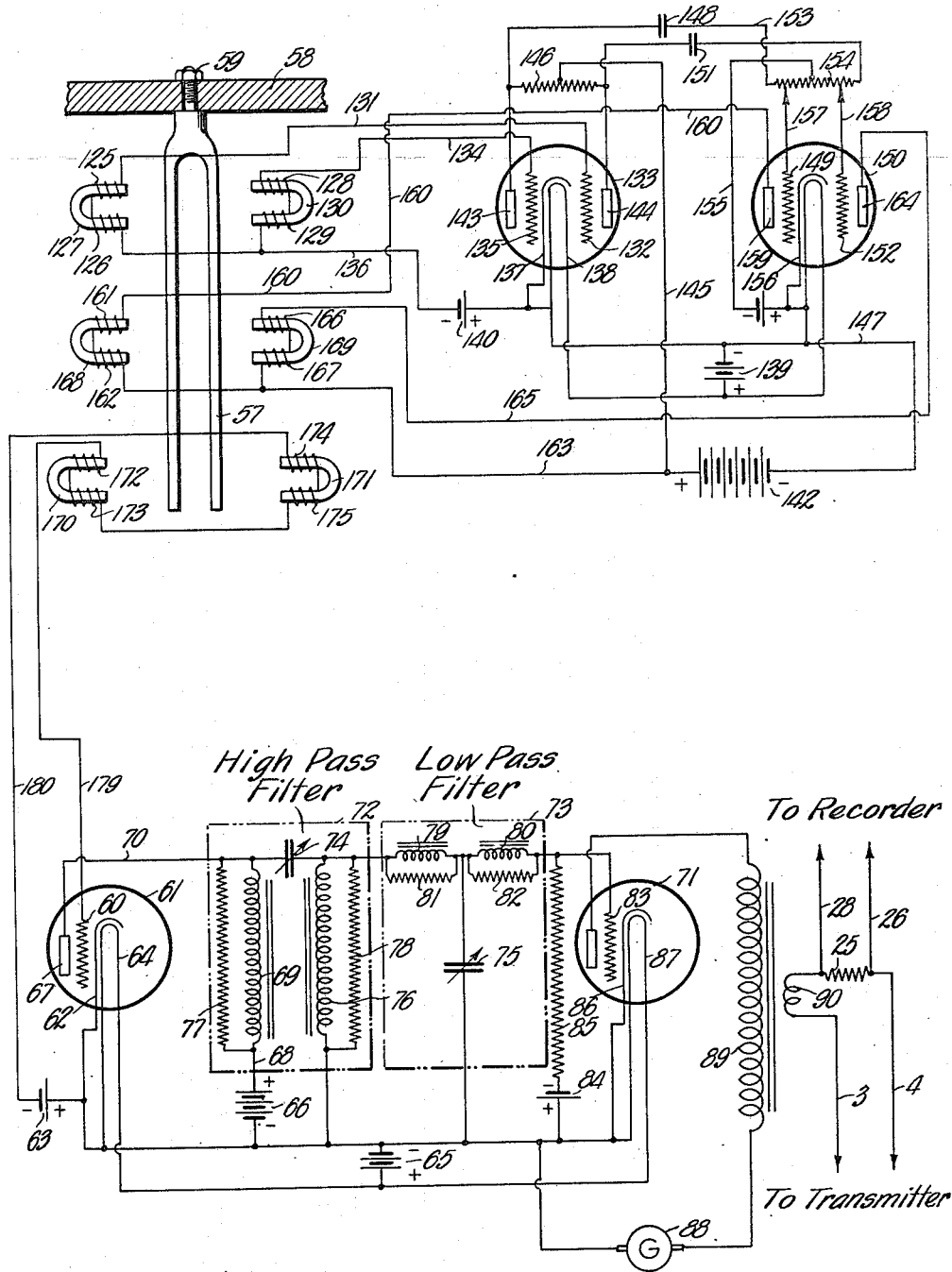
Figure 3 is a schematic view of an alternator capable of producing alternating current of fixed, predetermined frequency adapted to energize a transmitter for producing seismic waves capable of use in our invention.
Figure 5:
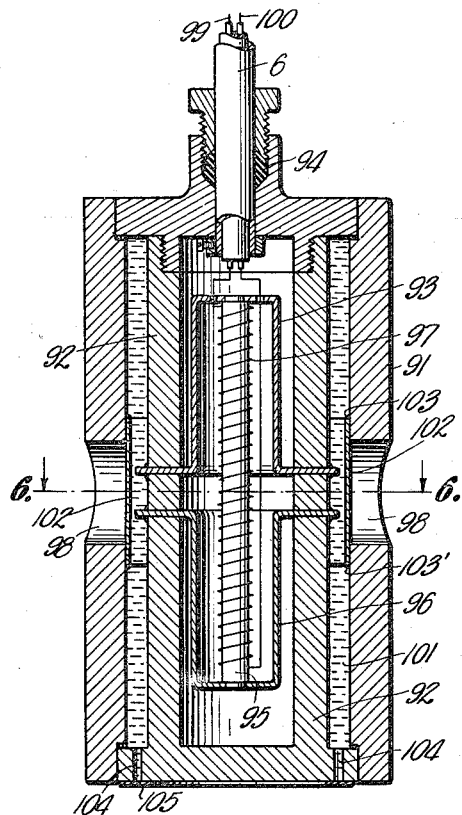
Figure 5 is a sectional view of a transmitter or receptor capable of use in carrying out our invention.
Figure 7:
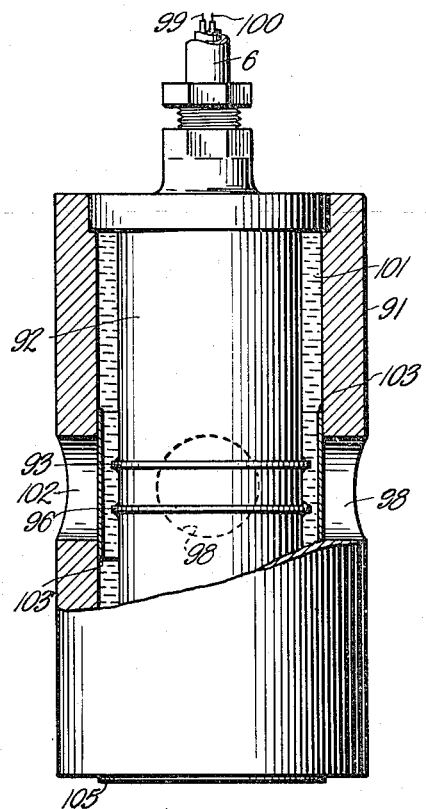
Figure 7 is another view of the transmitter or receptor shown in Figure 5 with part of the casing broken away.
Figure 6:
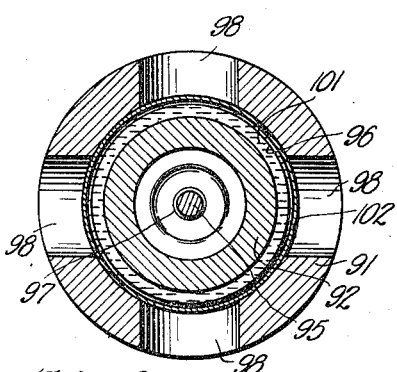
Figure 6 is a sectional view taken on a line 6—6 of Figure 5.
Figure 8:
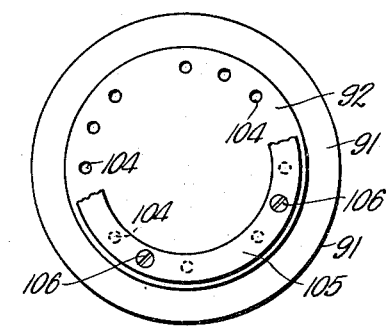
Figure 8 is a bottom plan view with parts broken away, of the transmitter or receptor shown in Figure 5.

Referring now to Figure 3, we have shown an alternator adapted to actuate the transmitter 2. It is to be understood that, while the source of seismic waves is shown in the instant application as a transmitter, this showing is by way of illustration only and not by way of limitation, and any suitable source of seismic waves may be employed in carrying out the method of our invention. For example, a blasting cap or a small charge of explosives may be suspended in the drill hole in the position occupied by transmitter 2, and exploded to form the source of seismic waves. Any suitable mechanism or electrical means for creating an impact which will produce seismic waves may be employed. Furthermore, it is to be understood that, while the source of seismic waves is shown to be above the two receptors 11 and 12, this showing is for purposes of illustration only and not by way of limitation, since the cource of seismic waves may be placed below the receptors or between them. If desired, a single receptor only may be employed. On the other hand, it may in some cases be desirable to employ a greater number of receptors than two.

Any suitable source of current may be employed, though we prefer to use a source which will provide an alternating current of fixed frequency. Such a source is shown schematically in Figure 3 in which a vibrating member such as a tuning fork 57 is suspended from any suitable support 58. The natural frequency will be determined by the length and shape of the vibrating member. It is contemplated that, when it is desired to obtain different frequencies, different tuning forks having different natural frequencies may be readily substituted by removing nut 59 and remounting a new tuning fork or vibrating member. Coils 125 and 126 are wound around a small permanent magnet 127. Coils 128 and 129 are wound around a small permanent magnet 130. The coils 125, 126, 128 and 129 are exciting coils which develop a voltage as the vibrating member 57 oscillates. This voltage is induced in the windings when the external field of the magnet is altered by the member 57 alternately coming closer and then farther away from the coils, altering the external field of the small magnets 127 and 130. The voltage induced in the exciting coils 125 and 126 is led by conductor 131 to one grid 132 of a thermionic tube 133. The voltage induced in coils 128 and 129 is impressed by conductor 134 upon the grid 135 of the thermionic tube 133, the return portion of the circuits being comprised by conductor 136 which is connected to the cathode 137 of the tube 133. The cathode 137 is heated by a filament heater 138 to which current is supplied from a battery 139. A battery 140 furnishes bias voltage for the grid. A battery 142 supplies positive potential to the plates 143 and 144 of the tube 133, through a conductor 145 and center tapped resistance 146, the return in the plate circuit being from the negative terminal of the battery 142 through conductor 147 to cathode 137. Plate 143 is coupled by condenser 148 to the grid 149 of thermionic tube 150. Plate 144 is coupled by condenser 151 to the grid 152 of the tube 150. The other side of condenser 148 is connected by conductor 153 to one end of a resistance 154. The other side of condenser 151 is connected to the opposite end of the resistance 154. The resistance 154 is center tapped by a conductor 155 connected to cathode 156 of tube 150. Conductor 157 adjustably connects grid 149 to the resistance 154, while conductor 158 adjustably connects grid 152 to the resistance 154. The adjustment of conductors 157 and 158 controls the output of tube 150 acting as a volume control. The plate 159 of the tube 150 is connected to the positive terminal of battery 142 through conductor 160, windings 161 and 162, and conductor 163. The plate 164 of the tube 150 is connected to the positive terminal of battery 142 by conductor 165, windings 166 and 167, and conductor 163. The windings 161 and 162 are about a soft iron electromagnet core 168. The windings 166 and 167 are about a soft iron electromagnet core 169. The windings 161, 162, 166 and 167 are driving windings. The output of tube 150 is controlled to supply sufficient energy to keep the member 57 in oscillation. The driving electromagnets 168 and 169 are positioned as far as possible on each side of oscillating member 57 and still maintain oscillation. This reduces damping caused by residual magnetism of the cores and allows member 57 to oscillate as freely as possible. The amplitude of motion of vibrating member 57 is quite low in order that the motion may be as free of harmonics as possible. Mounted on each side of oscillating member 57 are small permanent magnets 170 and 171. Windings 172 and 173 are disposed about the poles of magnet 170. Windings 174 and 175 are disposed about the poles of magnet 171. As the member 57 of magnetic material vibrates, driven by driving electromagnets, as described above, it will alternately approach and recede from each of the small permanent magnets 170 and 171, varying the external magnetic field and inducing voltages in the windings 172 and 173, and 174 and 175. The pickup windings 172, 173, 174 and 175 are well separated from the vibrating member 57, are balanced and adjusted to have as nearly as possible a linear relationship between changes in the external flux of the small magnets with changes in the position of the vibrating member 57. This will give induced electrical voltages substantially as free of harmonics as the motion of vibrating member 57. The voltages induced in the windings 172, 173, 174, and 175 are led by conductor 179 to the grid 60 of thermionic tube 61, the return circuit being completed by conductor 180 to cathode 62 of the tube 61. The grid is biased by a "C" battery 63. The cathode is provided with a filament heater 64 to which current is supplied from an "A" battery 65. Positive potential from a "B" battery 66 is supplied to the plate 67 of the tube 61 through the conductor 68, choke coil reactance 69, through conductor 70, as can readily be seen by reference to Figure 3. The thermionic tube 61 will amplify the induced voltages generated in the windings 172, 173, 174 and 175. The amplified voltage is passed to thermionic tube 71 for further amplification through a high pass filter 72 and a low pass filter 73. The condenser 74 of the high pass filter is set to reject frequencies lower than the fundamental of the vibrating member 57. The condenser 75 of the low pass filter is set to reject frequencies higher than the fundamental of the vibrating member 57. In parallel with the choke coil reactances 69 and 70 of the high pass filter are resistances 77 and 78. In parallel with the choke coil reactances 79 and 80 of the low pass filter are resistances 81 and 82. The resistances are of such value that the network is well damped in order that electrical oscillations will not be generated, enabling the natural frequencies of the vibrating member 57 to be reproduced faithfully in wave form. In this connection, it is unimportant whether or not phase changes occur.

Plate output of tube 61 is impressed through the filters upon the grid 83 of the thermionic tube 71, the grid being biased by a "C" battery 84 through a resistance 85. The cathode 86 of tube 71 is provided with a filament heater 87 which is supplied with current from the "A" battery 65. "B" power is supplied to the plate circuit of the thermionic tube 71 by a generator 88. The output of thermionic tube 71 is connected across the primary winding 89 of the transformer. The secondary winding 90 of the transformer is adapted to impress the alternating voltage upon the transmitter 2. The transformer, of which winding 89 is the primary, must be made with good iron and a high primary inductance in order to deliver energy at the frequency desired and in order to be as free of harmonics as possible.

In certain cases where it is not necessary to have a good wave form, the high pass filter and the low pass filter may be removed between tubes 51 and 71, and either a resistance coupling or transformer coupling may replace the filters. Frequencies sufficiently high may be normally used so that the output of the pickup coils 172, 173, 174, and 175 is fairly free of harmonic content if the design is carefully laid out.

It is to be understood that any suitable source of alternating current known to the art may be employed, such as for example a beat frequency oscillator in which case a power amplifier capable of properly exciting the transmitter will be employed.

Referring now to Figures 5, 6, 7 and 8, the transmitter construction is shown, it being understood that the same construction is employed for the receptors. The outer protecting case 91 houses an inner case 92, the inner case being sufficiently strong to withstand the borehole pressures encountered. We prefer to make it out of non-magnetic material. It may be made out of any suitable material such as composition, stainless steel or of phenol condensation products. The outer case 91 is made out of any suitable metallic material and is provided with a plurality of openings 98 disposed at a plurality of places so as to render the oscillator non-directional horizontally. The cable 6 enters the inner case through a stuffing box 94. The core 95 may be permanently magnetized or may be made out of magnetic iron. Disposed around the core is a coil 97, the ends of which are electrically connected to conductors 99 and 100. Core extensions 93 and 96 terminate in flanges which extend through the walls of the inner case 92, being brazed or welded thereto. These core extensions may be of a material having high permeability such as nickel-steel, while the core proper 95 may be a permanent magnet. The flanges of the core form the core poles and project through the casing 92 into the annular space between casings 92 and 91. This annular space is filled with a fluid 101 to protect the diaphragm 102 from collapsing under the borehole fluid pressure. The diaphragm 102 is welded peripherally at 103 and 103'. A plurality of openings 104 provide communication between the borehole and the fluid 101 within the annular space between the casings 91 and 92. These openings are normally closed by diaphragm 105 which is adapted to permit the pressure to equalize between the fluid in the well and the fluid 101. The diaphragm 105 is retained in place by any suitable means such as screws 106.

With respect to the operation of the transmitter, let us suppose the equalizing diaphragm 105 were not used, and the openings 104 were sealed. All parts of the transmitter except the diaphragms are constructed very rigidly so that it may be presumed, for the frequencies involved, that the parts remain substantially rigid. In view of the nearly incompressible character of the damping fluid, the power delivered to the magnetic circuit can only exhibit itself in harmonic distortion and rippling of the diaphragms. This would itself serve to set up vibratory waves in the borehole fluid, though with low efficiency. With the equalizing diaphragm the linear distance from the side diaphragms to the equalizing diaphragm is one quarter wave length or more for the frequency used. This provides that the inertia of the fluid involved in the return path will be such for the frequencies under consideration that a vibration wave motion will be set up which tends to deliver energy to the surrounding medium. If the distance from the side diaphragm to the equalizing diaphragm is a small fraction of the wave length for the particular frequency, the inertia of the material involved in the return path from side diaphragm to equalizing diaphragm is comparatively small and the path will nearly "short circuit" the energy delivered by the side diaphragm. With the equilizing diaphragm and a proper distance between it and the side diaphragms, good propagation of vibratory waves will result.

As electrical impulses are impressed upon conductors 99 and 100, the diaphragm 102 will move and energy is delivered horizontally through the fluid of the borehole to the geological strata. The viscosity of the fluid 101 is such that the combined damping caused by the magnetic circuit, the fluid 101 and the normal borehole fluid is adequate for the type of wave motion produced. Where transient impulses are employed and it is desired to control these transients, a more careful control of the damping of diaphragm 102 is necessary than when a steady state of wave motion is employed.

The structure just described may be employed as a receptor. Wave motion traveling through the geological layer causes a differential motion between the diaphragm and the case because of difference of inertia. This will produce a potential in the coil 97 in sympathy with the motion at the receptor, which potential is amplified and recorded as will be described more fully hereinafter.

It will be appreciated that the receptor is highly directional in that vertical motion along the supporting cable and through the borehole fluid will be materially suppressed because of the unusual rigidity of the diaphragm in the vertical direction as compared to the horizontal direction. The plurality of openings used around the periphery of the case render the receptor sensitive to horizontal motions in any direction. If it should be desired to use vertical vibrations and to receive them at a receptor, the receptor must be lowered in a position ninety degrees from that shown in Figure 5. Because of the use of a fixed frequency of vibration and the amplification and receiving system employed, vertical vibrations caused by the cable are rejected. This will be more fully described hereinafter.

The electrical voltages generated in the receptors are carried along the cable and impressed upon the amplification system. The conductors, as for example 17 and 18, leading to the amplification system, and the conductors in the cable may be shielded and the shield grounded to minimize voltages induced from the conductors carrying the energy from the source system to the transmitter. Conductors 17 and 18 carrying energy from the receptor connect across the primary winding 107 of the input transformer shown in Fig. 4. This winding has a low impedance to match the impedance of the receptor and to minimize induced voltages in the conductors from the source system conductors. The secondary winding 108 of the input transformer, one end of which is connected by conductor 109 to the grid 110 of the thermionic tube 111 provides a step-up for the voltage received by the receptor. The cathode 112 of the tube 111 is provided with a filament heater 113, which is furnished energy by an "A" battery 114 through leads 115 and 116. The grid 110 is biased by a "C" battery 117. The plate 118 of thermionic tube 111 is connected by conductor 119 to impress the output of tube 111 through a high pass filter 120 and a low pass filter 121, the filtered energy passing through conductor 122 to the grid 123 of thermionic tube 124. The condenser 181 of the high pass filter 120 is adjusted to reject frequencies below those of the predetermined frequency, while the condenser 182 of the low pass filter is adjusted to reject frequencies higher than those which it is desired to receive. The volume control comprising the resistance 183 and the variable arm 122 adjusts the overall gain. The grid 123 is biased by a "C" battery 184. Resistances 185 and 186 are connected across reactances 187 and 188 of the high pass filter, while reactances 191 and 192 are shunted by resistances 189 and 190. These resistances suitably damp the electrical network in order to prevent self-oscillation. This damping is desirable when transient impulses are received in order that the impulses will be amplified with reasonable faithfulness. Cathode 193 of tube 124 is provided with a filament heater 194 which is supplied energy from the "A" battery 114. Plate voltage is supplied from "B" battery 195, the positive terminal thereof being connected to the plate 118 of tube 111 by conductor 196, reactance 187 and conductor 119. The positive pole of "B" battery 195 is connected to the plate 197 of the tube 124 through conductor 198, primary winding 199 of the output transformer, and conductor 200.

In our method of seismic logging of boreholes in which respective velocity transmission characteristics of seismic energy through geological strata are measured to identify the respective strata, the measurement of velocities depends upon measuring differences in time. It will be observed that each receptor 11 and 12 of Figure 1 is provided with its own amplification system 19 and 24. In order to determine the difference in time, it is obvious that the characteristics of receptor 11 and its amplification system must be substantially identical to receptor 12 and its amplification system, if false time increments are to be avoided. These false time increments would indicate unlike phase displacement in the two channels. The filters therefore, must be carefully constructed with balanced inductances, resistances and capacities.

The secondary winding 201 of the output transformer is provided with a center tap 202 which furnishes potential to a rectifier tube 203. The two anodes 204 and 205 of the rectifier tube provide full wave rectification in connection with cathode 206. The resulting pulsating direct current is filtered by resistance 207 and capacity 208, the time constant being determined by the adjustment of the resistance 207 through variable arm 209 and the variable condenser 208. This filter smooths out the rectified potential and delivers to conductor 210 a potential which is negative with respect to the minus side of the "A" battery 114. The cathode 206 is provided with a filament 211 which is supplied energy from the "A" battery 114 through conductors 212 and 213. The conductor 210 serves as a grid return for the tube 111. The "C" battery 117 in the cathode circuit of tube 111 is of such value that the amplification of tube 111 is nearly maximum or of such value that a negative potential on the grid return lead 210 lowers the amplification of the tube 111.

It is well known that the amplification of a thermionic tube may be controlled by the bias on the grid return. A negative bias on conductor 210, supplied by the limiter, will lower the amplification of tube 111. The greater the output voltage of the tube 124, the greater will be the depressing bias furnished by the limiter tube 203. The arrangement, for steady state input voltages from the receptor, provides substantially a constant amplitude output.

As hereinbefore described, the recording system indicates phase difference of output channels from receptor 11 and receptor 12 and in making use of this phase difference, the output of each amplifier should be held substantially to a predetermined constant. This is accomplished by the limiter arrangement just described.

When transient effects are recorded, the limiting arrangement may be disconnected. If desired, suitable adjustments of resistance 207 and capacity 208 may be made in order to provide a sufficient time constant that little amplitude distortion will take place during the time interval of the transient but that amplification will alter slowly in order to eventually accomplish the desired purpose of recording recurring transient impulses from one receptor 11 and its amplifier at the same amplitude as recurring transient impulses from the other receptor 12 and its amplifier, even though the transients at the respective receptors are unequal in amplitude. With this adjustment, the amplitude limiters may be used during recording of transients.

The degree of limiting may be adjusted to the desired amount by the ratio of the limiter secondary winding 201, by the resistance 207, by the type of tube being used at 111, and by the load impedance in the plate 118 of tube 111. It may be further increased by returning the limiter governing potential to more than one tube. It is quite practical to balance two output amplitudes by means of our arrangement within a small percentage where the input varies five or ten to one for a steady state case.

Where predetermined steady frequencies are used, the amount of damping in the filters 120 and 121 need not be so great as when faithful reproduction of transients is required. Less damping allows a filter to provide a greater degree of discrimination against useless low and high frequencies received at the receptors.

Figure 11:
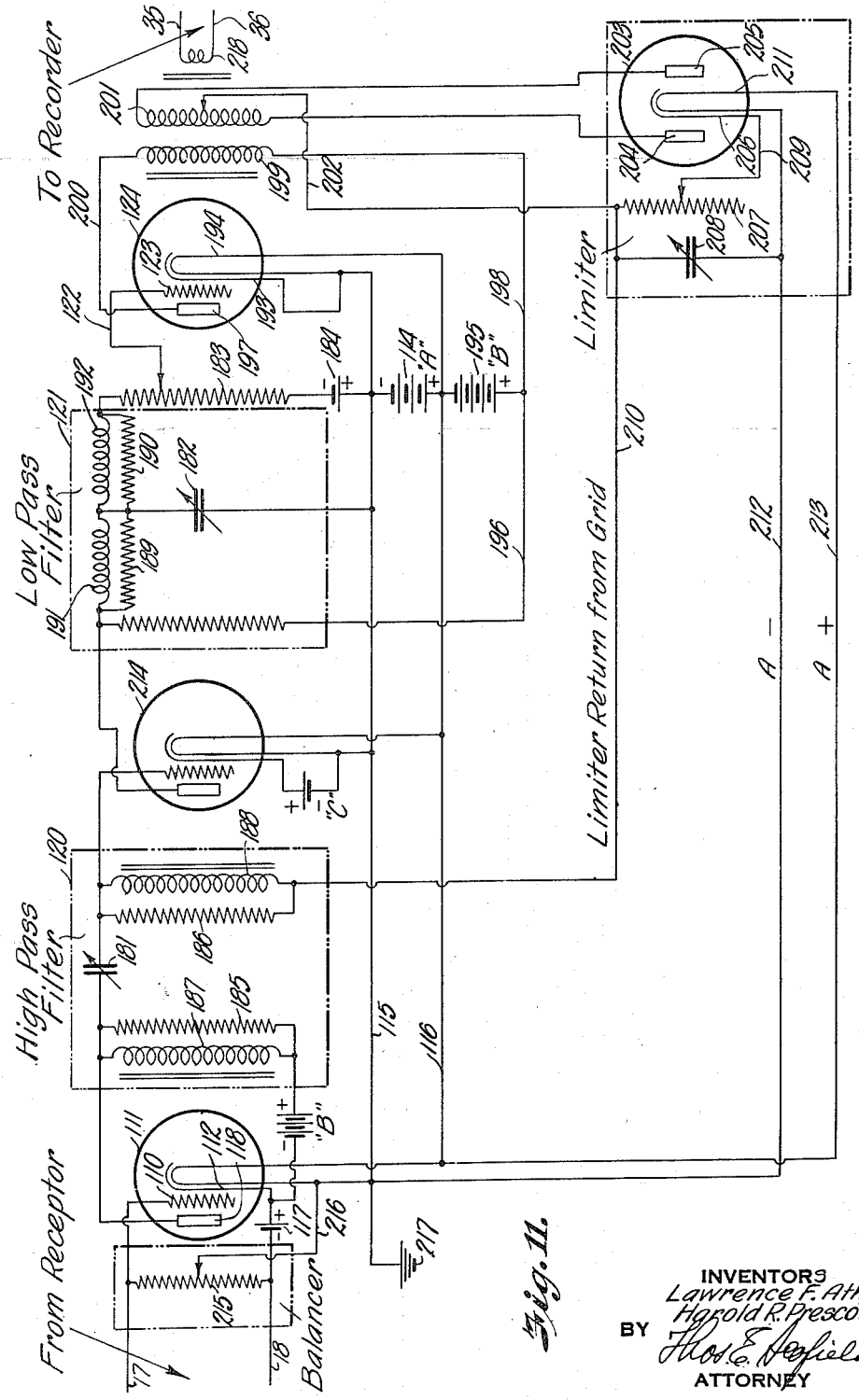
Figure 11 is a schematic view of another amplifying system capable of use in carrying out our invention.

Referring now to Figure 11, we have shown another type of amplifier which may be employed in carrying out the method of our invention. Like reference numerals are used to indicate like parts in the amplifiers shown in Figures 4 and 11. In Figure 11, the high pass filter 120 is separated from the low pass filter 121 by thermionic tube 214 to minimize the mutual effects caused by adjustments. The conductors 17 and 18 are provided with a balancer network to minimize voltages induced from the other conductors or extraneous sources. The voltages induced from extraneous sources in conductor 17 with respect to ground is very nearly equal in amount and phase to the voltages induced from the same extraneous sources in conductor 18. This is true because these conductors are positioned in the same cable and any extraneous field must induce the same voltage in one conductor as in the other. A balancer resistance 215 is connected across conductors 17 and 18 and an adjustable arm 216 is adapted to connect the resistance 215 to "—A" through conductor 115 and to ground 217. With arm 216 adjusted approximately at the mid-point of the resistance 215, the thermionic tube 111 delivers to its plate very little extraneous voltages induced in conductors 17 and 18. The exact amount will vary depending upon the adjustment of the arm 216. The grid varies in potential with respect to ground an amount determined by the induced voltages in conductor 17 which is connected to ground by the upper half of the balancer resistance 215. The cathode varies in potential with respect to ground an amount determined by the induced voltages in conductor 18 connected to ground by the lower half of the balancer resistance 215. Since the induced voltages in conductors 17 and 18 from external sources are substantially equal in amplitude and phase and since the impedance to ground from each conductor 17 and 18 is substantially equal, the grid and cathode will vary in potential with respect to ground an equal amount in amplitude and phase.

It will follow that the tube 111 will fail to amplify extraneous voltages, these voltages induced from extraneous sources in the conductors 17 and 18. Useful voltages, that is, voltages picked up by the receptor, will vary the potential of grid with respect to cathode and will therefore be amplified.

The operation of the amplifier in Figure 11, including the limiting arrangement, is otherwise the same as the amplifier shown in Figure 4. The amplified voltages are transmitted to an oscillograph through conductors 35 and 36 connected across the secondary 218 of the output transformer of tube 124.

Referring now to Figure 2 in which the recorder is indicated diagrammatically by the reference numeral 219, the oscillograph element 27 will indicate the current flowing through conductors 3 and 4 from the source system 1, both in amplitude and in phase. Oscillograph element 37 will form a trace upon the sensitized strip 33 which will indicate voltages received by receptor 11. The oscillograph element 44 will govern the trace which will indicate the voltages received by the receptor 12, while oscillograph element 49 will form the trace which will indicate the instantaneous summation of the electrical potentials from receptors 11 and 12. The variable arm 26 will control the energy delivered to the oscillograph element 27. The variable arm 52 and the resistance 53 will enable suitable impedance to be obtained for the oscillograph element 49.

The traces upon the record strip 33 will record the frequency, amplitude, phase, and wave form of the currents recorded by them.

The oscillograph elements are preferably quite high in natural frequency, especially when transient impulses are used, in order to produce the wave form, amplitude and phase faithfully. In a steady state case, the oscillograph element may have lower natural frequencies provided they are all adjusted to be similar in natural frequency and damping in order to introduce the same phase displacement in all channels. In the steady state case, the velocity differences in the borehole will be indicated by a phase or time difference and it is therefore necessary only to adjust the separate units which deliver the electrical potential for comparison to similar characteristics. Any difference then indicated will be that contributed by difference in vibrations arriving at receptors 11 and 12.

The filters will contribute some transient distortion and some phase shift but, if comparative measurements are made from one borehole to another, the differences in measurement will still be a valuable index and will serve almost as well as a faithful reproduction, because it is largely the differences in the measurements that are indicative of changes in geological strata.

The trace formed by oscillograph element 49 being a summation of the voltages recorded by oscillograph elements 37 and 44 will indicate the phase change between voltages being received by respective receptors 11 and 12. When the voltages are in phase, the amplitude of the trace made by oscillograph element 49 will be large. When the voltages received by receptors 11 and 12 are out of phase, the amplitude of the trace made by oscillograph element 49 will be at a minimum.

It is to be understood, of course that, while we have shown a transmitter as a source of seismic waves, any suitable source such as a blasting cap, a small charge of explosives or even a single click of the transmitter may be employed as a source of seismic waves.

Referring now to Figure 9, trace 400 is that made on the record strip 401 in borehole 5 of Figure 2 by oscillograph element 27. Trace 402 is that made in borehole 5 by oscillograph element 37. Trace 403 is that made by oscillograph element 44, while trace 404 is that made by oscillograph element 49. It will be observed that oscillograph element 49 gives a composite of oscillograph elements 37 and 44. Oscillograph element 37 operates in response to energy received from receptor 11. Oscillograph element 44 operates in response to energy received from receptor 12. When the respective energies received at receptors 11 and 12 are in phase, the response of oscillograph element 49 will be at maximum amplitude. When the respective energies received at receptors 11 and 12 are at the half way positions, they will be out of phase and the response of oscillograph element 49 will be zero. It follows, therefore that, if the distance between receptor 11 and receptor 12 is such that the travel time of the seismic wave from receptor 11 to receptor 12 in rock strata of slow velocity is one half of the wave length of the energy, then the composite trace 404 made by oscillograph element 49 will be of small amplitude when the receptors 11 and 12 are in rock strata of slow velocity.

Below the surface weathered zone, seismic velocities normally range from 5,000 to 20,000 feet per second. If the distance between receptor 11 and receptor 12 is five feet and the frequency of the transmitter is 500 cycles per second, that is, the period is .002 of a second, then the travel time between receptor 11 and receptor 12 in material capable of transmitting seismic energy at a velocity of 5,000 feet per second is .001 second and the receptors 11 and 12 will oscillate one half wave length out of phase giving a composite trace 404 on the record of zero amplitude. When the receptors 11 and 12 are in a material capable of transmitting seismic waves at a velocity of 10,000 feet per second, and the distance between the receptors is 5 feet, the travel time between receptors will be .0005 second and the receptors 11 and 12 will oscillate one quarter wave length out of phase and the corresponding amplitude will be recorded on trace 404.

Similarly, with the receptors 11 and 12, 5 feet apart and in a material capable of transmitting seismic waves at a velocity of 20,000 feet per second, the time of travel of seismic energy from receptor 11 to receptor 12 will be .00025 second and the detectors will be only one eighth wave length out of phase.

It will be clear that, if a continuous record were taken as the assembly of transmitter and receptors were lowered into a borehole, that the amplitude of the composite trace 404 would vary in amplitude in proportion to the velocity transmission characteristics of seismic energy through the material embraced between the receptors and records such as shown in Figure 9 would result, it being understood of course that the movement of the record strip is synchronized as a function of the movement of the assembly into the borehole.

In practicing our invention, the distance between the transmitter and the respective receptors, and the inter-receptor distance may be varied to suit conditions in the boreholes being investigated and the velocity and frequency relationships existing, as desired.

It will also be obvious that the receptors may be spaced on either side of the transmitter, both above the transmitter or both below the transmitter. If desired, two or more transmitters may be employed intermediately spaced from receptors. In the case where the transmitter is positioned between the receptors, if the velocity of the seismic waves is uniform the receptors may be coupled to oscillate exactly out of phase and zero amplitude will be recorded upon the trace 404. If the velocity between the transmitter and one receptor is greater than the velocity transmission characteristic between the transmitter and the other receptor, then the two receptors will oscillate out of phase and the amplitude of the composite trace will be proportional to the velocity difference.

The record strips may be calibrated for a given inter-receptor spacing and a given transmitter frequency. As pointed out hereinabove, the frequency will be kept substantially constant so that the record strip may be calibrated in velocity transmission characteristics on trace 404 as shown in the record strips of Figure 9.

Referring now to Figure 9, it will be observed that, in the record strip shown, the first layer encountered had a velocity transmission characteristic of 10,000 feet per second and a depth of about 60 feet. It then entered a layer having a velocity transmission characteristic of about 7500 feet per second, which layer extended to a depth of about 90 feet. A layer having a velocity transmission characteristic of about 14,000 feet per second, was then entered and this layer extended to a depth of about 120 feet. The next layer extending to a depth of about 170 feet had a velocity transmission characteristic of about 10,000 feet per second. The next deeper layer, about 35 feet thick, had a velocity transmission characteristic of about 17,500 feet per second. At a depth of 205 feet, a thin layer 15 feet deep was encountered, having a velocity transmission characteristic of 10,000 feet per second. The next layer extended to a depth of 320 feet and had a velocity transmission characteristic of 13,000 feet per second. At a depth of about 250 feet, a thin strata having a higher velocity transmission characteristic was encountered. The stratum extending from a depth of 320 feet to a depth of 370 feet had a velocity transmission characteristic of 5,000 feet per second.

It will be seen that, by lowering our assembly into a borehole, an accurate log of the strata encountered may be obtained directly.

The lower record strip in Figure 9 is that taken in borehole 5' of Figure 1. The corresponding strata may be readily identified.

Figure 10:
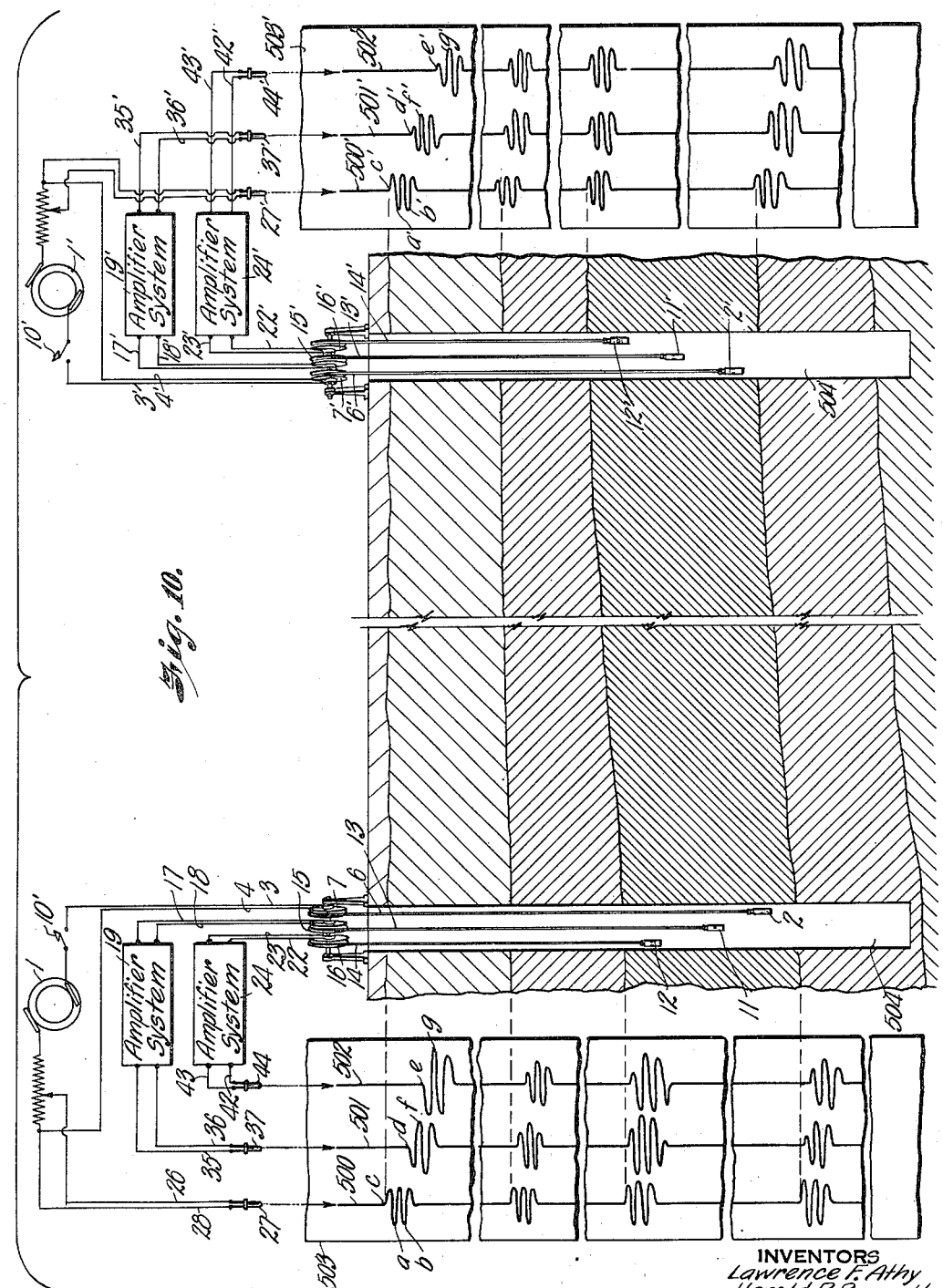
Figure 10 is a diagrammatic view of a geological section showing two boreholes, apparatus and record strips taken by means of transient seismic impulses.

Referring now to Figure 10, there is shown a diagrammatic view of two boreholes and record strips made, using the transient method of logging. In the transient method, the keys 10 and 10' are closed for a short period of time. If desired, the impulse may be a single click of the transmitter or the explosion of a small charge of explosives such as a blasting cap. When using the transient method, the composite trace is not needed and the oscillograph 49 may be disconnected. Oscillograph elements 27 and 27' will record the source of a steady state alternating current giving trace 500 upon the record strip. The oscillograph element 37 will form the trace 501 of arrivals at receptor 11. Oscillograph element 44 will form the trace 502 of arrivals at receptor 12.

Since the frequency of the alternator 1 is known, the trace 500 of the wave form and phase of the alternating current source will serve as an index of time. For example, if the frequency of the alternating source is 500 cycles per second, the time between point $a$ and point $b$ on trace 500 is .002 second.

The time interval of initiation of the transient impulse is indicated by point $c$ on trace 500. The time elapsing between the initiation of the impulse and its arrival at receptor 11 is the time between point $c$ on trace 500 and point $d$ on trace 501. Since this time may be readily measured, the travel time for the known distance readily gives the velocity of transmission of the seismic energy through the material separating $c$ and $d$. Similarly, the time elapsing between the initiation of the seismic wave and its arrival at receptor 12 will be indicated by the distance between point $c$ on trace 500 and point $e$ on trace 502.

The points $d$ and $e$ represent the time of the first arrival and represent the quickest time path for seismic energy.

It will also be observed that additional information may be obtained by selecting a part of the transient motion which does not necessarily represent the quickest time path. Such information may be obtained by using the difference in time between a point $f$ on trace 501 and a point $g$ on trace 502. These points $f$ and $g$ may represent paths of the earliest maximum amplitude or energy. The time interval between corresponding points $f$ and $g$ will be an index of the velocity of earliest maximum amplitude. Large time intervals will indicate slow velocities for the material surrounding the transmitter and receptor. It will be readily apparent that the transient records will give a different type of velocity information than is obtained from the continuous log method heretofore described. By use of transient records, the distortion of any given motion in traveling from the transmitter to a receptor by comparison with the starting motion at the transmitter may be observed. Attenuation, that is, decay of amplitude of motion of a transient may be observed. Differences of attenuation may be noted. These additional factors may serve to identify different beds having substantially the same velocity transmission characteristics. The record strip 503 bearing traces 500, 501, and 502 was made in borehole 504. Borehole 504' gave a record strip 503' and a comparison of the record strips clearly shows how boreholes may be correlated to indicate the structure.

Figure 12:
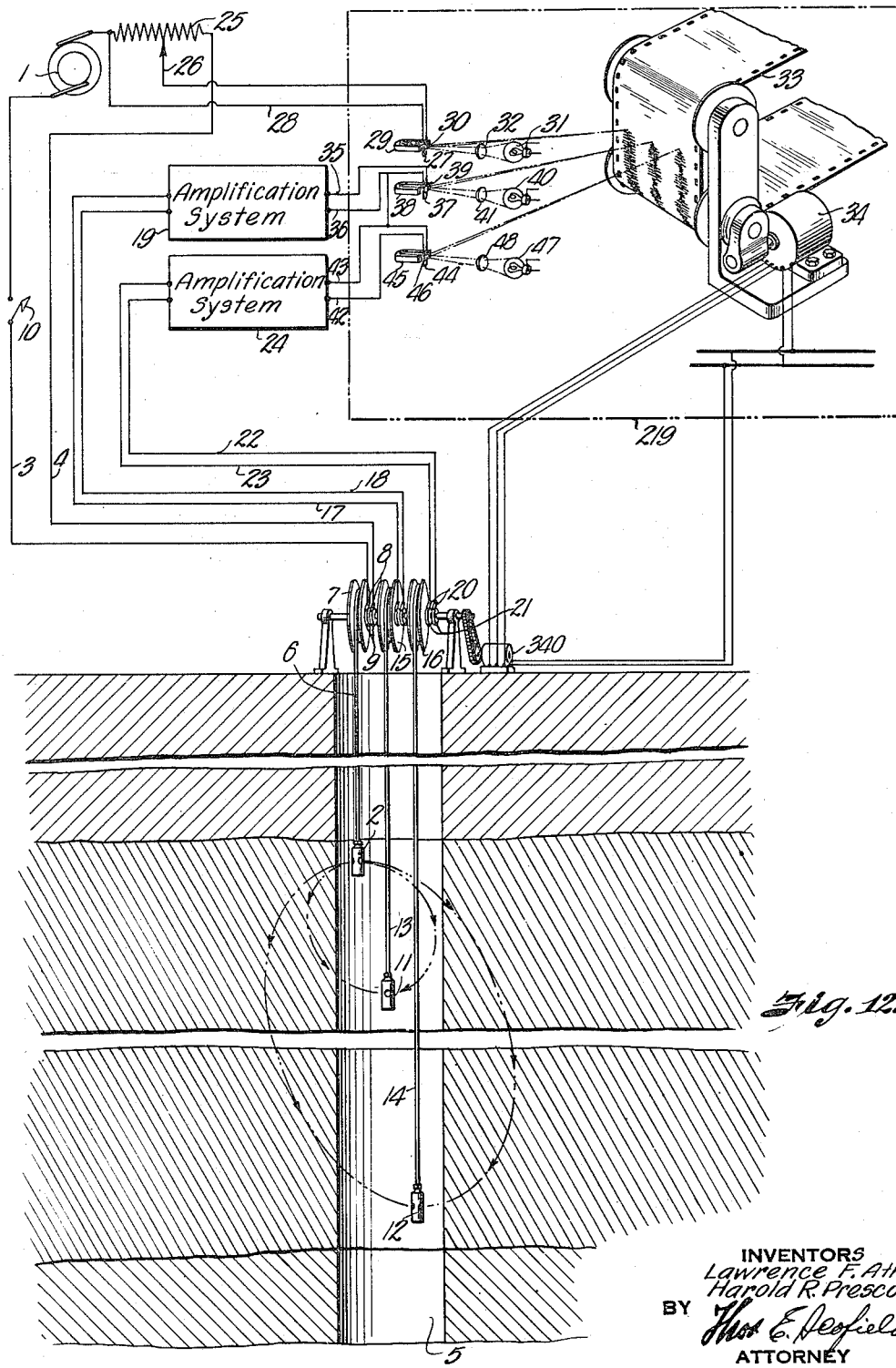
Figure 12 is a diagrammatic view of apparatus capable of carrying out another aspect of our invention whereby amplitude variations of seismic energy may be received.
Figure 13:
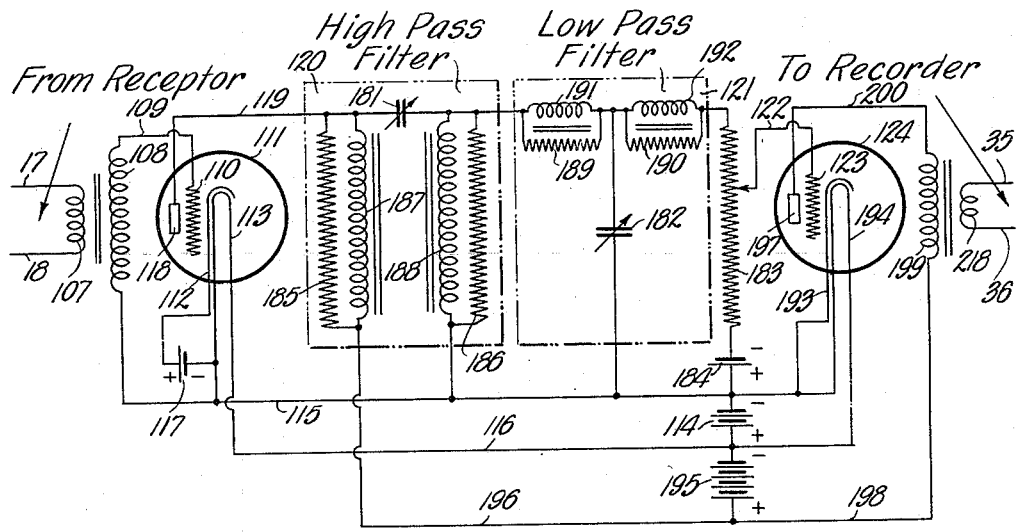
Figure 13 is a schematic view of an amplifying system adapted for use in connection with the arrangement shown in Figure 12.

Referring now to Figure 12, the arrangement there shown is similar to that shown in Figure 2, except that the oscillograph 49 is disconnected and the amplifiers shown in Figure 13 are employed in order to permit the oscillographs 37 and 44 to record amplitude variations of the seismic energy received at the receptors 11 and 12 as the system is lowered through the borehole. Like reference numerals are used to indicate like parts in both views.

Referring now to Figure 13, the amplifier shown is similar to that shown in Figure 4 except that the rectifier tube 203 of Figure 4 and its connections have been eliminated. This will permit the energy received at the receptors to be amplified and transferred to oscillographs 37 and 44 to record amplitude variations in the seismic energy received at the respective receptors. The limiting arrangement is removed since, in the aspect of the invention under discussion, amplitude variations are studied to reveal different strata.

Figure 14:
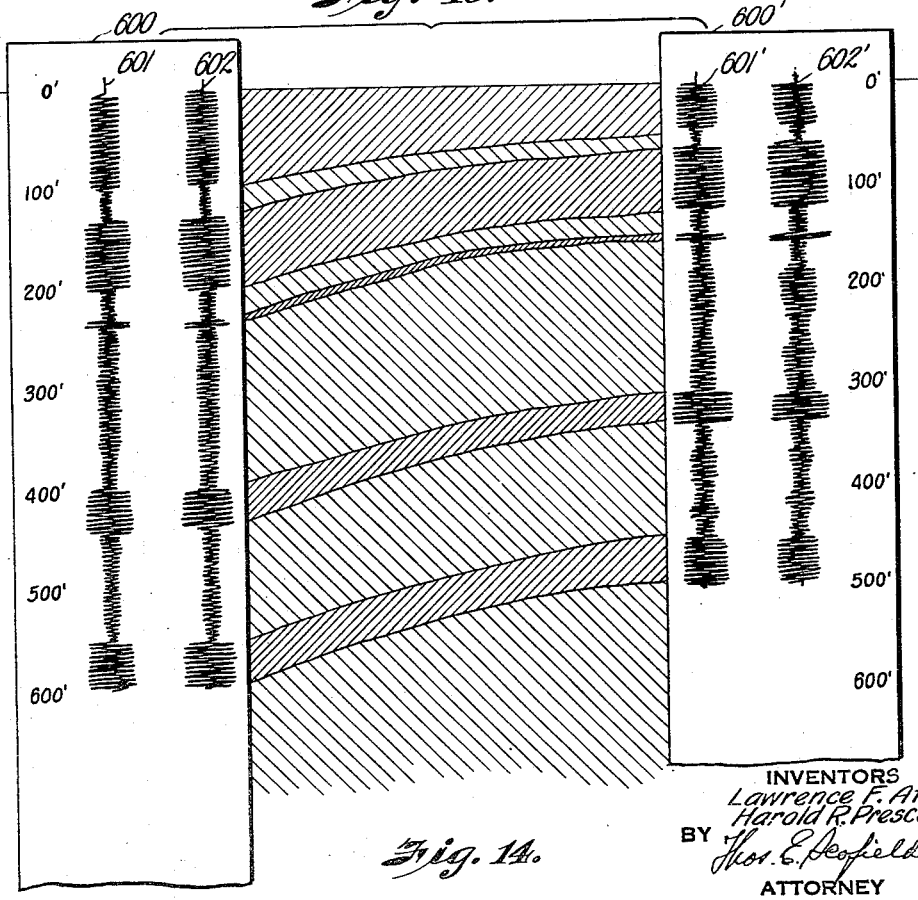
Figure 14 is a diagrammatic view of a geological section showing record strips taken by means of the apparatus shown in Figures 12 and 13.

Referring now to Figure 14, record strips made with the apparatus shown in Figures 12 and 13 are disclosed. Closely hatched layers indicate good transmitting mediums which are clearly apparent by large amplitude on the traces shown on record strips 600 and 600'. Trace 601 on record strip 600 is that given by oscillograph element 37, while trace 602 is that made by oscillograph element 44. When the amplitude of the trace is great, the seismic energy has traveled through a good transmitting medium. When the amplitude of the trace is small, the seismic energy has traveled through a poor transmitting medium. Trace 601' corresponds to trace 601, and trace 602' of record strip 600' corresponds to trace 602 of record strip 600. The traces are formed as the arrangement of transmitter and receptors is lowered through the borehole, it being understood that the record strip travels as a function of the motion of the arrangement so that distance on the record strip will be proportioned to depth.

A comparison of the variations in the amplitude of a plurality of record logs in different boreholes will permit correlation between them. If desired, the arrangement shown in Figure 2 and the arrangement shown in Figure 12 may be used simultaneously, employing for this purpose six oscillographs instead of the four shown in Figure 2. In such case, two amplifiers will be connected to each receptor, each amplifier having its own oscillograph. One amplifier would use its limiter, the other would not.

We also contemplate that spacing between the transmitter 2 and the receptors 11 and 12 may be used to enlarge the information which we obtain. If, for example, the transmitter 2 is placed at an appreciable distance from the receptors 11 and 12, then the record logs of velocities and amplitude variations are primarily those contributed by the virgin strata surrounding the borehole, since in this case the borehole section will form but a negligible part of the total path traversed by the seismic energy. If, on the other hand, the transmitter 2 is placed close to the receptor 11 and the receptor 12 is separated a few feet from receptor 11, then two types of information are available. Since the distance between transmitter 2 and receptor 12 is appreciable, the corresponding velocity and amplitude variation logs represent characteristics of virgin strata. Since the distance between transmitter 2 and receptor 11 is small, the variations received by receptor 11 will represent those contributed by structure near the borehole.

It will be apparent that a dense, non-porous strata will be influenced far less physically in a region closely surrounding the borehole than in a porous strata such as sandstone, which is less dense. The control of distances between the transmitter and the near receptor, and between the transmitter and the far receptor, or the inter-receptor distance, may be exercised to give the desired type of information.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of logging boreholes including the steps of generating seismic waves of a predetermined frequency within a borehole, receiving seismic energy within a borehole at a plurality of points spaced from each other a predetermined vertical distance, converting respective seismic energies received into electrical energies in sympathy therewith, adding the electric energies, and recording the sum of said electrical energy.

2. A method of logging boreholes including the steps of generating seismic waves of a predetermined frequency at a point within a borehole, continuously and simultaneously receiving seismic waves within said borehole at a plurality of points spaced apart a predetermined distance, converting the respective seismic energies into electrical energies in sympathy therewith, continuously adding said electrical energies, and recording the resultant electrical energy.

3. A method of logging boreholes including the steps of generating seismic waves of a predetermined frequency at a point within a borehole, receiving seismic waves within said borehole at a plurality of points spaced apart a predetermined distance, converting the respective seismic energies into electrical energies in sympathy therewith, continuously adding said electrical energies, recording the resultant electrical energy, continuously moving the seismic wave generating point and said receiving points in predetermined relation through the borehole, and continuously moving the record strip upon which said resultant electrical energy is being recorded as a function of the motion of said seismic energy generation and receiving points.

4. A method of logging boreholes including the steps of generating seismic waves of predetermined frequency within a borehole, receiving said seismic waves at points within said borehole spaced a predetermined distance from each other and from the wave generation point, converting the seismic waves received into electrical waves in sympathy therewith, rejecting waves lower in frequency than said predetermined frequency, adding the remaining electric energies and recording the resultant added electric energy.

5. A method of logging boreholes including the steps of generating seismic waves of predetermined frequency within a borehole, receiving said seismic waves at points within said borehole spaced a predetermined distance from each other and from the wave generation point, converting the seismic waves received into electrical waves in sympathy therewith, rejecting waves higher in frequency than said predetermined frequency, adding the remaining electric energies and recording the resultant added electric energy.

6. A method of logging boreholes including the steps of generating seismic waves of predetermined frequency within a borehole, receiving said seismic waves at points within said borehole spaced a predetermined distance from each other and from the wave generation point, converting the seismic waves received into electrical waves in sympathy therewith, rejecting waves lower in frequency than said predetermined frequency, rejecting waves higher in frequency than said predetermined frequency, adding the remaining electric energies and recording the resultant added electric energy.

7. A method of logging boreholes including the steps of generating seismic waves of a predetermined frequency at a point within a borehole, receiving seismic waves at two points within said boreholes positioned at different levels and at a predetermined distance from each other and from said wave generation point, converting the respective received seismic waves into respective electrical waves in sympathy with the received seismic waves, filtering the electrical waves to reject frequencies higher than the predetermined frequency and frequencies lower than the predetermined frequency, adding respective electrical waves and continuously recording the resultant electric wave.

8. A method of logging boreholes including the steps of generating seismic waves at a point within a borehole, receiving seismic energy at a point within the borehole removed from said wave generation point, converting the received seismic energy into electrical energy in sympathy therewith and simultaneously recording the seismic energy being generated and the electrical energy being received.

9. A method of logging boreholes including the steps of generating seismic waves at a point within a borehole, receiving seismic waves within said borehole at a plurality of points spaced at different elevations from said wave generation point, converting the respective received seismic energies into electrical energies in sympathy herewith and simultaneously recording the seismic energy being generated and the electrical energy being received.

10. A method of logging boreholes including the steps of generating seismic waves at a point within a borehole, receiving seismic waves within said borehole at a plurality of points spaced at different elevations from said wave generation point, converting the respective received seismic energies into electrical energies in sympathy herewith, continuously adding said electrical energies and recording the resultant electrical energy.

11. A method of logging boreholes including the steps of generating seismic waves within a borehole, receiving said seismic waves at a point within a borehole spaced from the wave generation point, converting said seismic waves into electrical waves in sympathy therewith, rejecting electrical waves higher in frequency than a predetermined frequency and recording the remaining electrical waves.

12. A method of logging boreholes including the steps of generating seismic waves within a borehole, receiving said seismic waves at a point within a borehole spaced from the wave generation point converting said seismic waves into electrical waves in sympathy therewith, rejecting electrical waves lower in frequency than a predetermined frequency and recording the remaining electrical waves.

13. A method of logging boreholes including the steps of generating seismic waves within a borehole, receiving said seismic waves at a point within a borehole spaced from the wave generation point, converting said seismic waves into electrical waves in sympathy therewith, rejecting electrical waves higher in frequency than a predetermined frequency, rejecting electrical waves lower in frequency than a predetermined frequency and recording the remaining electrical waves.

14. A method of logging boreholes including the steps of generating seismic waves at a point within a borehole, receiving seismic waves at two points within the borehole positioned at different levels from said wave generation point, converting the respective received seismic waves into respective electrical waves in sympathy with the received seismic waves, filtering the electrical waves to reject frequencies higher than a predetermined frequency and frequencies lower than a predetermined frequency and recording respective filtered electrical waves.

15. A method of logging boreholes including the steps of generating seismic waves at a point within a borehole, receiving seismic waves at two points within the borehole positioned at different levels from said wave generation point, converting the respective received seismic waves into respective electrical waves in sympathy with the received seismic waves, filtering the electrical waves to reject frequencies higher than a predetermined frequency and frequencies lower than a predetermined frequency, adding respective electrical waves and continuously recording the resultant electrical wave.

16. A method of logging boreholes including the steps of generating seismic waves at a point within a borehole, receiving seismic waves at two points within the borehole positioned at different levels from said wave generation point, converting the respective received seismic waves into respective electrical waves in sympathy with the received seismic waves, amplifying respective electrical waves, governing said amplification to limit the amplitude of the amplified electrical waves to a predetermined point, integrating said amplified limited electrical waves and continuously recording the integrated electrical waves.

17. A method of logging boreholes including the steps of generating an alternating current of predetermined frequency, converting said alternating current into seismic energy at a point within the borehole to create seismic waves of predetermined frequency, receiving said seismic waves at a point within the borehole removed from said wave generation point, converting said received seismic waves into electrical waves in sympathy therewith, filtering said electrical waves to reject frequencies higher than said predetermined frequency and frequencies lower than said predetermined frequency, and recording the resultant electrical waves.

18. A method of logging boreholes including the steps of generating an alternating current of predetermined frequency, converting said alternating current into seismic waves at a point within said borehole, receiving seismic energy within said borehole at two points positioned at different levels within the borehole than said seismic wave generation point, converting respective received seismic waves into electrical potentials in sympathy therewith, rejecting electrical potentials higher in frequency than said predetermined frequency, rejecting electrical potentials lower in frequency than said predetermined frequency, separately amplifying respective resultant electrical potentials, governing said amplification to produce respective amplified electrical potentials of predetermined limited amplitude, adding said potentials and recording said added filtered amplified limited electrical potentials.

19. A method of logging boreholes including the steps of generating an alternating current of predetermined frequency, converting said alternating current into seismic waves at a point within said borehole, receiving seismic energy within said borehole at two points positioned at different levels within the borehole than said seismic wave generation point, converting respective received seismic waves into electrical potentials in sympathy therewith, rejecting electrical potentials higher in frequency than said predetermined frequency, rejecting electrical potentials lower in frequency than said predetermined frequency, separately amplifying respective resultant electrical potentials, governing said amplification to produce respective amplified electrical potentials of predetermined limited amplitude, adding said potentials, moving said wave generation point and said wave receiving point within said borehole in predetermined relation while conducting the above steps and continuously recording said added filtered amplified limited electrical potentials.

20. A method of logging boreholes including the steps of generating seismic waves at a point within the borehole, receiving the seismic waves within said borehole at a plurality of points spaced at different, predetermined distances from the wave generation point, converting the respective seismic energies into electric energy in sympathy therewith, simultaneously recording the electric energies being received at respective receptors upon a common record strip, moving the transmitter and receptors through the borehole in said predetermined relation and moving said record strip as a function of the movement of the transmitter and receptor assembly.

LAWRENCE F. ATHY.
HAROLD R. PRESCOTT.